United States Patent
Tonishi

(10) Patent No.: US 7,763,107 B2
(45) Date of Patent: Jul. 27, 2010

(54) INK FOR INK-JET RECORDING AND INK SET FOR INK-JET RECORDING

(75) Inventor: Hisako Tonishi, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 395 days.

(21) Appl. No.: 11/965,398

(22) Filed: Dec. 27, 2007

(65) Prior Publication Data

US 2009/0165674 A1    Jul. 2, 2009

(51) Int. Cl.
    *C09D 11/02*    (2006.01)
(52) U.S. Cl. .................................. 106/31.65
(58) Field of Classification Search ............. 106/31.65; 347/100
    See application file for complete search history.

(56) References Cited

U.S. PATENT DOCUMENTS

| | | | |
|---|---|---|---|
| 6,733,120 B2 | 5/2004 | Ogasawara et al. | |
| 6,960,622 B2 | 11/2005 | Nakano | |
| 7,323,046 B1 * | 1/2008 | Wolf et al. | 106/413 |
| 2003/0007051 A1 * | 1/2003 | Takahashi et al. | 347/100 |
| 2008/0079793 A1 * | 4/2008 | Kato et al. | 347/100 |
| 2009/0013905 A1 * | 1/2009 | VanRemortel et al. | 106/439 |

FOREIGN PATENT DOCUMENTS

| | | |
|---|---|---|
| JP | 2003082267 | 3/2003 |
| JP | 2003096371 | 4/2003 |
| JP | 2003213187 | 7/2003 |

* cited by examiner

*Primary Examiner*—Helene Klemanski
(74) *Attorney, Agent, or Firm*—Banner & Witcoff, Ltd

(57) ABSTRACT

A black ink for ink-jet includes a pigment wherein an average particle diameter Da of the pigment is in the range of about 90 nm to about 130 nm. In addition, (D95−D5)/Da is about 1.4 or less, where D5 is the 5% cumulative particle diameter of the pigment and D95 is the 95% cumulative particle diameter of the pigment. A color ink for ink-jet recording also includes a pigment with the value Da of about 100 nm or less and (D95−D5)/Da of about 1.3 or less.

11 Claims, No Drawings

INK FOR INK-JET RECORDING AND INK SET FOR INK-JET RECORDING

BACKGROUND

1. Field of the Invention

The present invention relates to a black ink and color inks for ink-jet recording (hereinafter, these may be referred to as "inks for ink-jet recording") and to an ink set for ink-jet recording.

2. Description of the Related Art

Generally, ink-jet recorded objects are required to have good water resistance, light fastness, ozone resistance and the like in order to ensure storage stability. Hence, pigment inks in which a pigment that is superior with regard to the above-listed properties compared to dyes is used as a coloring agent have attracted attention as inks for ink-jet recording.

Such pigment inks that are capable of providing recorded objects with excellent storage stability may cause a problem with respect to ejectability from an ink-jet head because the pigment used is not water soluble. Accordingly, there is a demand to improve the ejectability of such pigment inks. In addition, in order to obtain high quality text printing, there is a demand for black pigment inks that provide black-printed objects with a high optical density (OD) and clear edges. In order to obtain high quality photo images, there is a demand for color pigment inks that impart a high gloss to color-printed objects. Furthermore, ink set for ink-jet recording are similarly required to satisfy these demands.

Conventionally, the demands described above are addressed by techniques including the selection of suitable ink components such as a solvent, a dispersing agent, a pigment and the like and optimization of the average particle diameter of the pigment. By using conventional techniques, it is difficult at the present time to develop pigment inks for ink-jet recording which can provide the high quality ink-jet recorded objects demanded by the market.

SUMMARY

It is an object to provide an ink for ink-jet recording and an ink set for ink-jet recording which may provide black-printed objects having a high OD value and clear edges or color-printed objects having a high gloss, and which exhibit good ejectability from an ink-jet head.

The present inventor have paid particular attention to the average particle diameter of the pigment and to the value obtained by dividing a particle diameter distribution width defined by the difference between the 95% cumulative particle diameter and 5% cumulative particle diameter of the pigment by the average particle diameter. The inventor have found that the above object may be achieved by adjusting each of the above values within a specific value range.

Aspects of the invention provides a black ink for ink-jet recording including a pigment. In the black ink, an average particle diameter Da of the pigment is in the range of about 90 nm to about 130 nm, and (D95−D5)/Da is about 1.4 or less, where D5 is a 5% cumulative particle diameter of the pigment and D95 is a 95% cumulative particle diameter of the pigment.

Aspects of the invention provides a color ink for ink-jet recording including a pigment. In the color ink, an average particle diameter Da of the pigment is about 100 nm or less, and (D95−D5)/Da is about 1.3 or less, where D5 is a 5% cumulative particle diameter of the pigment and D95 is a 95% cumulative particle diameter of the pigment.

Aspects of the invention provides an ink set for ink-jet recording including a plurality of different color inks. Each of the color inks contains a pigment. An average particle diameter Da of the pigment is about 100 nm or less, and (D95−D5)/Da is about 1.3 or less, where D5 is a 5% cumulative particle diameter of the pigment and D95 is a 95% cumulative particle diameter of the pigment.

Aspects of the invention provides an ink set for ink-jet recording including a black ink containing a pigment and a color ink containing a pigment. In the black ink, an average particle diameter Da of the pigment contained therein is in the range of about 90 nm to about 130 nm, and (D95−D5)/Da is about 1.4 or less, where D5 is a 5% cumulative particle diameter of the pigment contained therein and D95 is a 95% cumulative particle diameter of the pigment contained therein. In the color ink, an average particle diameter Da of the pigment contained therein is about 100 nm or less, and (D95−D5)/Da is about 1.3 or less, where D5 is a 5% cumulative particle diameter of the pigment contained therein and D95 is a 95% cumulative particle diameter of the pigment contained therein.

DETAILED DESCRIPTION OF THE PREFERRED EMBODIMENTS

A black ink for ink-jet recording contains a pigment. The average particle diameter Da of the pigment is in the range of about 90 nm to about 130 nm, and in the range of about 95 nm to about 130 nm. In addition, (D95−D5)/Da is about 1.4 or less, and about 1.3 or less, where D5 is the 5% cumulative particle diameter of the pigment and D95 is the 95% cumulative particle diameter of the pigment. In the present specification, the average particle diameter Da of the pigment is a volume average particle diameter weighted by volume defined in JIS Z8819-2 or the like. The 5% cumulative particle diameter D5 and the 95% cumulative particle diameter D95 are defined as follows. First, the profile of a cumulative volume curve with respect to the particle diameter of the pigment is determined. Then, the 5% cumulative particle diameter D5 is defined as a particle diameter where the accumulated volume on the cumulative volume curve of the pigment is 5%, and the 95% cumulative particle diameter D95 is defined as a particle diameter where the accumulated volume on the cumulative volume curve of the pigment is 95%. The average particle diameter Da of the pigment, the 5% cumulative particle diameter D5 and the 95% cumulative particle diameter D95 are values measured by means of a dynamic light scattering method. Specifically, for example, a dynamic light scattering particle distribution analyzer (LB-500, product of HORIBA, Ltd.) may be used as the apparatus for undertaking the measurement.

The reason that the average particle diameter Da of the pigment contained in the black ink is in the range of about 90 nm to about 130 nm is as follows. When Da is less than about 90 nm, the OD value tends to be low. When Da exceeds about 130 nm, the ejectability of the ink from ink-jet nozzles tends to deteriorate.

The reason that the value of (D95−D5)/Da is about 1.4 or less is that when this value exceeds about 1.4, clear edges tend not to be formed. The value obtained by subtracting D5 from D95 (D95−D5) represents a high precision particle diameter distribution width and may be referred to as "a particle diameter distribution width" in the present specification. Generally, a large particle diameter distribution width means that the non-uniformity of the particle diameter is high, and a small particle diameter distribution width means that the uniformity of the particle diameter is high.

The black ink that has the characteristics derived from the composition described above exhibits good ejectability, and objects printed with the black ink exhibit a high OD value and have clear edges.

A color ink for ink-jet recording contains a pigment. The value of Da is about 100 nm or less, and is in the range of about 50 nm to about 100 nm. The value of (D95–D5)/Da is about 1.3 or less and about 1.2 or less.

The reason that the average particle diameter Da of the pigment contained as a coloring agent in the color ink is about 100 nm or less is as follows. When Da exceeds about 100 nm, the gloss of objects printed with the color ink is impaired even when the condition for (D95–D5)/Da is satisfied. The reason that the average particle diameter Da of the pigment is about 50 nm more is that when Da is less than about 50 nm, the hiding power of the pigment is low on recording media such as recording paper.

The reason that the value of (D95–D5)/Da is about 1.3 or less is that when the value exceeds about 1.3, the gloss of the color-printed objects is impaired.

The color ink that has the characteristics derived from the composition described above exhibits good ejectability, and objects printed with the color ink have a high gloss.

A plurality of different types of the above-described color ink, being suitably a yellow ink, a magenta ink and a cyan ink, may be provided and used in combination as a set. This set may be suitably used as an ink set for ink-jet recording. Specifically, this ink set includes a plurality of different color inks, each color ink containing a pigment. The value of Da of each pigment is about 100 nm or less, and is in the range of about 50 nm to about 100 nm. The value of (D95–D5)/Da is about 1.3 or less, and about 1.2 or less. No particular limitation is imposed on the method for producing an ink set from a plurality of different color inks, and any conventional method for producing an ink set may be used. In this color ink set having the characteristics described above, each of the color inks exhibits good ejectability from an ink-jet head, and a high gloss may be imparted to objects printed in primary colors (single colors) and in secondary colors (mixed colors). Therefore, high quality photo images may be obtained.

In this ink set, the difference in the value of (D95–D5)/Da between the pigment contained in one of any two of the plurality of different color inks and the pigment contained in the other color ink is about 0.1 or less. In this manner, a higher gloss may be imparted to objects printed in secondary colors, and higher quality photo images may be obtained.

Furthermore, an ink set for ink-jet recording that is also adaptable to black text printing may be constituted by both the black ink and the color ink. Specifically, such an ink set for ink-jet recording includes the black ink containing a pigment and the color ink containing a pigment. In the pigment contained in the black ink, the value of Da is in the range of about 90 nm to about 130 nm and in the range of about 95 nm to about 130 nm, and the value of (D95–D5)/Da is about 1.4 or less and about 1.3 or less. In the pigment contained in the color ink, the value of Da is about 100 nm or less and is in the range of about 50 nm to about 100 nm, and the value of (D95–D5)/Da is about 1.3 or less and about 1.2 or less. Furthermore, a plurality of different types of the color ink may be used. In particular, a yellow ink, a magenta ink and a cyan ink are used are suitably used as the color inks. In this case, the difference in the value of (D95–D5)/Da between the pigment contained in one of any two of the plurality of different color inks and the pigment contained in the other color ink is about 0.1 or less. In this manner, a higher gloss may be imparted to objects printed in secondary colors, and higher quality photo images may be obtained.

The following method, for example, may be used as the method to adjust, within the predetermined ranges, the values of Da and (D95–D5)/Da of the pigment used in each of the above-described inks and ink sets for ink-jet recording. Specifically, when the pigment is dispersed using a wet sand mill, the dispersion processing is carried out by appropriately selecting the dispersion processing time, the number of times the dispersion processing is undertaken, the particle diameter of the zirconia beads used, the pore size of a membrane filter used after the dispersion processing is undertaken, and the like. In this case, when the dispersion processing time is increased or when the number of times the dispersion processing is undertaken is increased, the value of Da tends to decrease, and the value of (D95–D5)/Da also tends to decrease. Even when zirconia beads with a small particle diameter are selected, the value of Da tends to decrease, and the value of (D95–D5)/Da also tends to decrease. When a membrane filter with a small pore size is selected, the value of Da tends to decrease, and the value of (D95–D5)/Da also tends to decrease.

Components such as pigment and solvent which have used in conventional ink-jet recording may be appropriately used as components to be used in the above-described inks and ink sets of the present invention. Conventional recording media and ink-jet heads may also be appropriately used as recording media and ink-jet heads to be applied to the inkjet recording using the above-described inks and ink sets of the present invention.

Examples of the pigment which may be used in the black ink include, without limitation, carbon blacks such as MA7, MA8, MA100 (products of Mitsubishi Chemical Corporation), color black FW200 (product of Degussa) and the like. Examples of the pigment which may be used in the yellow ink include, without limitation, C.I. Pigment Yellows 3, 13, 74, 83, 128, 154 and the like. Examples of the pigment which may be used in the magenta ink include, without limitation, C.I. Pigment Reds 5, 48, 112, 122, 177, 202, 207 and the like. Examples of the pigment which may be used in the cyan ink include, without limitation, C.I. Pigment Blues 15, 15:3, 15:4, 16, 60 and the like. A self-dispersing type pigment processed by means of a known method may be used as each of the pigments.

The amount of the pigment contained in each of the inks depends on a desired printing density, color and the like. When the amount of the pigment is too low, the color is not satisfactorily developed on a paper. When the amount is too high, nozzles of an ink-jet head are likely to be clogged. The amount of the pigment with respect to the amount of each of the inks is in the range of about 1 wt. % to about 10 wt. %, and in the range of about 1 wt. % to about 7 wt. %.

Each of the inks may contain a dispersing agent for ensuring the dispersion stability of the pigment. Examples of the dispersing agent include, without limitation, a polymer dispersing agent, a surfactant and the like. Examples of the polymer dispersing agent include, without limitation, proteins such as gelatin, albumin and the like; natural rubbers such as gum arabic, tragacanth and the like; glucosides such as saponin and the like; cellulose derivatives such as methyl cellulose, carboxy cellulose, hydroxy methyl cellulose and the like; natural polymers such as lignin sulfonate, shellac and the like; anionic polymers such as salts of polyacrylic acid, salts of styrene-acrylic acid copolymers, salts of vinylnaphthalene-acrylic acid copolymers, salts of styrene-maleic acid copolymers, salts of vinylnaphthalene-maleic acid copolymers, sodium salts of β-naphthalenesulfonic acid formalin condensate, phosphates of β-naphthalenesulfonic acid formalin condensate and the like; non-ionic polymers such as polyvinyl alcohol, polyvinyl pyrrolidone, polyethylene glycol and the like; and the like. Examples of the surfactant include, without limitation, anionic surfactants such as higher alcohol sulfate ester salts, liquid fatty oil sulfate ester salts, alkyl allyl sulfonates and the like; and non-ionic surfactants such as polyoxyethylene alkyl ethers, polyoxyethylene alkyl esters, sorbitan alkyl esters, polyoxyethylene sorbitan alkyl esters and the like. The dispersing agent may be used alone or in suitable combination of two or more thereof.

The amount of the dispersing agent in each of the inks is appropriately determined according to the type of pigment and the type of dispersing agent. When the amount of the dispersing agent is too low, the dispersion stability of the pigment is insufficient. When the amount is too high, the viscosity of the ink increases to cause difficulty in ejecting the ink from an ink-jet head. The amount of the dispersing agent with respect to 100 parts by weight of the pigment is in the range of about 5 parts by weight to about 50 parts by weight, and in the range of about 10 parts by weight to about 40 parts by weight.

Each of the inks contains water. Deionixed water is used as the water. The amount of the water in each of the inks is determined according to the type and composition of the water soluble organic solvents used or to the desired properties of the ink. When the amount of the water is too low, the viscosity of the ink increases, causing difficulty in ejecting the ink from an ink-jet head. When the amount is too high, the coloring agent is precipitated or aggregated due to the evaporation of water, and the nozzles of an ink-jet head are likely to become clogged. The amount of the water with respect to the amount of each of the inks is in the range of about 10 wt. % to about 95 wt. %, and in the range of about 10 wt. % to about 80 wt. %.

Each of the inks may contain water soluble organic solvents. The water soluble organic solvents are categorized into humectants and penetrants according to their functions. The humectant is added to each ink in order to prevent clogging of the nozzles of an ink-jet head. The penetrant is added to each ink in order to allow the ink to rapidly penetrate into a recording medium upon printing.

Examples of the humectant include, without limitation, water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. When the amount of the humectant in each of the inks is too low, the clogging of the nozzles of an ink-jet head is not satisfactorily prevented. When the amount is too high, the viscosity of the ink increases, causing difficulty in ejection from an ink-jet head. The amount of the humectant with respect to the amount of each of the inks is in the range of about 5 wt. % to about 50 wt. %, and in the range of about 10 wt. % to about 40 wt. %.

Examples of the penetrant include, without limitation, glycol ethers typified by ethylene glycol-based and propylene glycol-based alkyl ethers and the like. Examples of the ethylene glycol-based alkyl ether include, without limitation, ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Examples of the propylene glycol-based alkyl ether include, without limitation, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether and the like. When the amount of the penetrant in each of the inks is too low, the penetrability is unsatisfactory. When the amount is too high, the penetrability is excessively high, so that blurring such as feathering and the like is likely to occur. The amount of the penetrant with respect to the amount of the ink is in the range of about 0.1 wt. % to about 10 wt. %, and in the range of about 0.5 wt. % to about 7 wt. %.

Each of the inks may contain, in addition to the humectant and the penetrant, still another water soluble organic solvent for other purposes such as the prevention of the ink from drying in the end portion of an ink-jet head, the improvement of the printing density, the achievement of vivid color development and the like. Examples of such an additional water soluble organic solvent include, without limitation, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; pyrrolidones such as 2-pyrrolidone, N-methyl-2-pyrrolidone and the like; 1,3-dimethyl-2-imidazolidinone; and the like.

Each of the inks may contain, in addition to the components described above, conventionally known surfactants; viscosity modifiers such as polyvinyl alcohol, cellulose and the like; surface tension modifiers, mildew proofing agents; anticorrosive agents; and the like in accordance with need.

Each of the inks may be produced by dispersing the pigment, water, the water soluble organic solvents, the dispersing agent and the like by means of a general disperser such as a ball mill, a roll mill, a high-speed sand mill or the like.

Each of the ink sets may be produced by combining the black ink and the color inks by means of a conventional method for preparing an ink set.

Ink-jet recording may be performed by filling the individual inks or the individual inks of the ink set into ink tanks of a known ink-jet recording apparatus and ejecting the inks from an ink-jet head onto a recording medium such as paper.

EXAMPLES

The present invention will now be specifically described by way of Examples and Comparative Examples, but the present invention is not limited to these Examples. Various changes, modifications and improvements may be made based on the knowledge of a person skilled in the art, as long as they do not depart from the scope of the present invention.

In the Examples and Comparative Examples below, the average particle diameter, 95% cumulative particle diameter (D95) and 5% cumulative particle diameter (D5) of the pigment used in each of the inks were measured using a dynamic light scattering particle distribution analyzer (LB-500, product of HORIBA, Ltd.) by means of a dynamic scattering method.

Example 1

Preparation of Black Ink 1 (Bk1))

25 parts by weight of carbon black (MA7, product of Mitsubishi Chemical Corporation), 6 parts by weight of polyoxyethylene lauryl ether ammonium sulfate (average polymerization degree of oxyethylene=12), 10 parts by weight of glycerin and 59 parts by weight of water (ion exchanged water) were mixed together. Subsequently, dispersion processing was performed in a wet sand mill using zirconia beads as the medium, whereby a carbon black dispersion was obtained. The measurement results of the average particle diameter Da (nm), 95% cumulative particle diameter (nm) and 5% cumulative particle diameter (nm) of the carbon black in the obtained carbon black dispersion and the value of (D95−D5)/Da computed from the above values are summarized in Table 1.

Separately, 54.9 parts by weight of water (ion exchanged water), 23 parts by weight of glycerin, 2 parts by weight of dipropylene glycol-n-propyl ether and 0.1 parts by weight of SURFYNOL® 465 (product of Air Products and Chemicals, Inc.) were mixed together, whereby 80 parts by weight of an ink solvent was prepared. Then, 80 parts by weight of the prepared ink solvent was gradually added to 20 parts by weight of the carbon black dispersion under stirring, and the stirring was continued for 30 minutes. Subsequently, the mixture was filtered through a membrane filter, whereby the black ink 1 (Bk1) was obtained. The amount of the carbon black with respect to the amount of the ink was 5 wt %.

Examples 2 and 3, and Comparative Examples 1 to 4

Preparation of Black Inks 2 to 7 (Bk2 to Bk7))

According to the preparation method of the black ink 1 (Bk1) of Example 1, black inks 2 to 7 (Bk2 to Bk7) having the same composition as that in Example 1 were prepared. The black ink 2 (Bk2) was prepared in Example 2, and the black ink 3 (Bk3) was prepared in Example 3. The black ink 4 (Bk4) was prepared in Comparative Example 1, and the black ink 5 (Bk5) was prepared in Comparative Example 2. Furthermore, the black ink 6 (Bk6) was prepared in Comparative Example 3, and the black ink 7 (Bk7) was prepared in Comparative Example 4. The measurement results of the average particle diameter Da (nm), 95% cumulative particle diameter (nm) and 5% cumulative particle diameter (nm) of the carbon black in the carbon black dispersions obtained in each of the Examples and Comparative Examples and the value of (D95−D5)/Da computed from the above values are also summarized in Table 1.

Example 4

Preparation of Yellow Ink 1 (Y1))

20 parts by weight of C.I. Pigment Yellow 128, 5 parts by weight of polyoxyethylene lauryl ether ammonium sulfate (average polymerization degree of oxyethylene=12), 10 parts by weight of glycerin and 65 parts by weight of water (ion exchanged water) were mixed together. Subsequently, dispersion processing was performed in a wet sand mill using zirconia beads as the medium, whereby a yellow pigment dispersion was obtained. The measurement results of the average particle diameter Da (nm), 95% cumulative particle diameter (nm) and 5% cumulative particle diameter (nm) of the yellow pigment in the obtained yellow pigment dispersion and the value of (D95−D5)/Da computed from the above values are summarized in Table 2.

Separately, 53.9 parts by weight of water (ion exchanged water) 24 parts by weight of glycerin, 2 parts by weight of dipropylene glycol-n-propyl ether and 0.1 parts by weight of SURFYNOL® 465 (product of Air Products and Chemicals, Inc.) were mixed together, whereby 80 parts by weight of an ink solvent was prepared. Then, 80 parts by weight of the prepared ink solvent was gradually added to 20 parts by weight of the yellow pigment dispersion under stirring, and the stirring was continued for 30 minutes. Subsequently, the mixture was filtered through a membrane filter, whereby the yellow ink 1 (Y1) was obtained. The amount of C.I. Pigment Yellow 128 with respect to the amount of the ink was 4 wt. %.

Example 5 and Comparative Example 5

Preparation of Yellow Inks 2 and 3 (Y2 and Y3))

According to the preparation method of the yellow ink 1 (Y1) of Example 4, yellow inks 2 and 3 (Y2 and Y3) having the same composition as that in Example 4 were prepared. The yellow ink 2 (Y2) was prepared in Example 5, and the yellow ink 3 (Y3) was prepared in Comparative Example 5. The measurement results of the average particle diameter Da (nm), 95% cumulative particle diameter (nm) and 5% cumulative particle diameter (nm) of the yellow pigment in the yellow pigment dispersion obtained in each of Example and Comparative Examples and the value of (D95−D5)/Da computed from the above values are also summarized in Table 2.

Example 6

Preparation of Magenta Ink 1 (M1))

20 parts by weight of C.I. pigment Red 122, 5 parts by weight of polyoxyethylene lauryl ether ammonium sulfate (average polymerization degree of oxyethylene=12), 10 parts by weigh of glycerin and 65 parts by weight of water (ion exchanged water) were mixed together. Then, dispersion processing was performed in a wet sand mill using zirconia beads as the medium, whereby a magenta pigment dispersion was obtained. The measurement results of the average particle diameter Da (nm), 95% cumulative particle diameter (nm) and 5% cumulative particle diameter (nm) of the magenta pigment in the obtained magenta pigment dispersion and the value of (D95−D5)/Da computed from the above values are also summarized in Table 2.

Separately, 53.9 parts by weight of water (ion exchanged water), 24 parts by weight of glycerin, 2 parts by weight of dipropylene glycol-n-propyl ether and 0.1 parts by weight of SURFYNOL® 465 (product of Air Products and Chemicals, Inc.) were mixed together, whereby 80 parts by weight of an ink solvent was prepared. Then, 80 parts by weight of the prepared ink solvent was gradually added to 20 parts by weight of the magenta pigment dispersion under stirring, and the stirring was continued for 30 minutes. Subsequently, the mixture was filtered through a membrane filter, whereby the magenta ink 1 (M1) was obtained. The amount of C.I. Pigment Red 122 with respect to the amount of the ink was 4 wt. %.

Example 7 and Comparative Example 6

Preparation of Magenta Inks 2 and 3 (M2 and M3))

According to the preparation method of the magenta ink 1 (M1) of Example 6, magenta inks 2 and 3 (M2 and M3) having the same composition as that in Example 6 were prepared. The magenta ink 2 (M2) was prepared in Example 7, and the magenta ink 3 (M3) was prepared in Comparative Example 6. The measurement results of the average particle diameter Da (nm), 95% cumulative particle diameter (nm)

and 5% cumulative particle diameter (nm) of the magenta pigment in the magenta pigment dispersion obtained in each of Example and Comparative Example and the value of (D95−D5)/Da computed from the above values are also summarized in Table 2.

Example 8

Preparation of Cyan Ink 1 (C1))

20 parts by weight of C.I. Pigment Blue 15:3, 5 parts by weight of polyoxyethylene lauryl ether ammonium sulfate (average polymerization degree of oxyethylene=12), 10 parts by weight of glycerin and 65 parts by weight of water (ion exchanged water) were mixed together. Then, dispersion processing was performed in a wet sand mill using zirconia beads as the medium, whereby a cyan pigment dispersion was obtained. The measurement results of the average particle diameter Da (nm), 95% cumulative particle diameter (nm) and 5% cumulative particle diameter (nm) of the cyan pigment in the obtained cyan pigment dispersion and the value of (D95−D5)/Da computed from the above values are also summarized in Table 2.

Separately, 53.9 parts by weight of water (ion exchanged water), 24 parts by weight of glycerin, 2 parts by weight of dipropylene glycol-n-propyl ether and 0.1 parts by weight of SURFYNOL® 465 (product of Air Products and Chemicals, Inc.) were mixed together, whereby 80 parts by weight of an ink solvent was prepared. Then, 80 parts by weight of the prepared ink solvent was gradually added to 20 parts by weight of the cyan pigment dispersion under stirring, and the stirring was continued for 30 minutes. The mixture was filtered through a membrane filter, whereby the cyan ink 1 (C1) was prepared. The amount of C.I. Pigment Blue 15:3 with respect to the amount of the ink was 4 wt. %.

Example 9 and Comparative Example 7

Preparation of Cyan Inks 2 and 3 (C2 and C3))

According to the preparation method of the cyan ink 1 (C1) of Example 8, cyan inks 2 and 3 (C2 and C3) having the same composition as that in Example 8 were prepared. The cyan ink 2 (C2) was prepared in Example 9, and the cyan ink 3 (C3) was prepared in Comparative Example 7. The measurement results of the average particle diameter Da (nm), 95% cumulative particle diameter (nm) and 5% cumulative particle diameter (nm) of the cyan pigment in each of the obtained cyan pigment dispersions and the value of (D95−D5)/Da computed from the above values are also summarized in Table 2.

Examples 10 and 11, and Comparative Example 8

Preparation of Ink Sets 1 to 3)

The yellow, magenta and cyan inks summarized in Table 3 were used in combination, whereby ink sets for ink-jet recording was constituted. The ink set 1 was constituted in Example 10, the ink set 2 was constituted in Example 11, and the ink set 3 was constituted in Comparative Example 8. The yellow inks 1 and 2, magenta inks 1 to 3 and cyan inks 1 to 3 used in the ink sets 1 to 3 were the same as the yellow inks 1 and 2, magenta inks 1 to 3 and cyan inks 1 to 3 used in Examples 4 to 9 and Comparative Examples 5 to 7.

Experiments for evaluating inks and ink sets for ink-jet recording

<Printing Conditions>

Each of the above-prepared inks and the inks in the above-produced ink sets was filled into a predetermined ink cartridge. The ink cartridge was attached to a digital multifunction device equipped with an ink-jet recording apparatus (DCP-115C, product of Brother Industries, Ltd.), and a printing evaluation was performed. Ejectability evaluation patterns were printed on plain paper (DATA COPY paper, product of m-real) using each of the inks. Specifically, a text printing pattern and a solid printing pattern were printed on plain paper (DATA COPY paper, product of m-real) using each of the black inks, and a solid printing pattern was printed on glossy paper (BP61GLA, product of Brother Industries, Ltd.) using each of the color inks.

<Ink Ejectability Evaluation>

The ejectability evaluation patterns were printed on plain paper (DATA COPY paper, product of m-real) using each of the inks and were visually observed in order to determine whether non-ejection and irregular ejection occurred.

Evaluation Criteria

A: Non-ejection and irregular ejection were not observed.

C: Non-ejection and irregular ejection were observed.

<OD Value Evaluation>

The object solid-printed using each of the black inks on plain paper (DATA COPY paper, product of m-real) was measured in order to obtain the optical density value (OD value) using an optical densitometer (RD914, product of Macbeth).

Evaluation Criteria

A: The OD value was 1.1 or greater.

C: The OD value was less than 1.1.

<Edge Evaluation>

For a text sample printed using each of the black inks on plain paper (DATA COPY paper, product of m-real), the black edges were visually evaluated.

Evaluation Criteria

A: The letters and ruled lines were sharp, and no blurring was found. The letters were clearly readable irrespective of their size.

B: The letters and ruled lines were not sharp, and blurring was found. However, the letters were clearly readable irrespective of their size.

C: The letters and ruled lines were not sharp, and blurring was found. Small letters were not easily readable.

<Gloss Evaluation>

For each of the objects solid-printed on glossy paper (BP61GLA, product of Brother Industries, Ltd.) in primary colors using the yellow, magenta and cyan inks and in secondary colors of red, green and blue colors formed by each of the ink sets, the gloss was visually evaluated.

Evaluation Criteria

A: The gloss was good.

B: The object was glossy and was practically usable.

C: The object was not glossy and was not practically usable.

TABLE 1

|  | Ex. 1 Bk1 | Ex. 2 Bk2 | Ex. 3 Bk3 | Comp. Ex. 1 Bk4 | Comp. Ex. 2 Bk5 | Comp. Ex. 3 Bk6 | Comp. Ex. 4 Bk7 |
|---|---|---|---|---|---|---|---|
| Average particle diameter Da: (nm) | 121 | 128 | 99 | 82 | 151 | 109 | 142 |
| 5% cumulative particle diameter: D5 (nm) | 51 | 77 | 50 | 41 | 81 | 45 | 64 |
| 95% cumulative particle diameter: D95 (nm) | 217 | 191 | 175 | 137 | 247 | 216 | 266 |
| (D95 − D5)/Da | 1.37 | 0.89 | 1.26 | 1.17 | 1.10 | 1.57 | 1.42 |
| Evaluation  Ink ejectability | A | A | A | A | C | A | C |
| OD value | A | A | A | C | A | A | A |
| Edge | B | A | A | A | A | C | C |

TABLE 2

|  | Ex. 4 Y1 | Ex. 5 Y2 | Comp. Ex. 5 Y3 | Ex. 6 M1 | Ex. 7 M2 | Comp. Ex. 6 M3 | Ex. 8 C1 | Ex. 9 C2 | Comp. Ex. 7 C3 |
|---|---|---|---|---|---|---|---|---|---|
| Average particle diameter: Da (nm) | 86 | 70 | 120 | 97 | 82 | 129 | 90 | 69 | 96 |
| 5% cumulative particle diameter: D5 (nm) | 48 | 32 | 58 | 46 | 45 | 63 | 48 | 41 | 45 |
| 95% cumulative particle diameter: D95 (nm) | 133 | 115 | 204 | 171 | 129 | 234 | 143 | 107 | 216 |
| (D95 − D5)/Da | 0.99 | 1.19 | 1.22 | 1.29 | 1.02 | 1.33 | 1.06 | 0.96 | 1.78 |
| Evaluation  Ink ejectability | A | A | A | A | A | A | A | A | A |
| Gloss | A | A | C | B | A | C | A | A | C |

TABLE 3

|  | Example 10 Ink set 1 | | | Example 11 Ink set 2 | | | Comp. Ex. 8 Ink set 3 | | |
|---|---|---|---|---|---|---|---|---|---|
|  | Y1 | M1 | C1 | Y1 | M2 | C2 | Y3 | M3 | C3 |
| Average particle diameter Da: (nm) | 86 | 97 | 90 | 86 | 82 | 69 | 120 | 129 | 96 |
| 5% cumulative particle diameter: D5 (nm) | 48 | 46 | 48 | 48 | 45 | 41 | 58 | 63 | 45 |
| 95% cumulative particle diameter: D95 (nm) | 133 | 171 | 143 | 133 | 129 | 107 | 204 | 234 | 216 |
| (D95 − D5)/Da | 0.99 | 1.29 | 1.06 | 0.99 | 1.02 | 0.96 | 1.22 | 1.33 | 1.78 |
| Evaluation  Gloss (red color) |  | B |  |  | A |  |  | C |  |
| Gloss (green color) |  | A |  |  | A |  |  | C |  |
| Gloss (blue color) |  | B |  |  | A |  |  | C |  |

Discussion for the experimental results summarized in Tables 1 to 3 is given.

(Black Inks)

In the black inks 2 and 3 (Bk2 and Bk3) of Examples 2 and 3, the average particle diameter Da fell within the range of 90 nm to 130 nm and the value of (D95−D5)/Da was 1.3 or less. Therefore, good results were obtained, i.e., the results of the ink ejectability evaluation, the OD value evaluation and the edge evaluation were all "A".

In the black ink 1 (Bk1) of Example 1, the results of the ink ejectability evaluation and the OD value evaluation were "A", but the result of the edge evaluation was "B". This may be because the value of (D95−D5)/Da was slightly large, so that the amount of small pigment particles contained in the ink was somewhat larger.

In the black ink 4 (Bk4) of Comparative Example 1, the average particle diameter of the pigment was 90 nm or less. Therefore, the result of the OD value evaluation was "C".

In the black ink 5 (Bk5) of Comparative Example 2, the average particle diameter of the pigment exceeded 130 nm Therefore, the result of the ink ejectability evaluation was "C".

In the black ink 6 (Bk6) of Comparative Example 3, the value of (D95−D5)/Da exceeded 1.3. Therefore, the result of the edge evaluation was "C."

In the black ink 7 (Bk7) of Comparative Example 4, the average particle diameter of the pigment exceeded 130 nm. Therefore, the result of the ink ejectability evaluation was "C". In addition, the value of (D95−D5)/Da exceeded 1.3. Therefore, the result of the edge evaluation was "C".

(Yellow Inks)

In the yellow inks 1 and 2 (Y1 and Y2) of Examples 4 and 5, the average particle diameter Da was 100 nm or less, and the value of (D95−D5)/Da was 1.2 or less. Therefore, good results were obtained, i.e., the results of the ink ejectability evaluation and the gloss evaluation were "A".

In the yellow ink 3 (Y3) of Comparative Example 5, the average particle diameter of the pigment exceeded 100 nm. Therefore, the result of the gloss evaluation was "C".

(Magenta Inks)

In the magenta ink 2 (M2) of Example 7, the average particle diameter Da was 100 nm or less, and the value of (D95−D5)/Da was 1.2 or less. Therefore, good results were obtained, i.e., the results of the ink ejectability evaluation and the gloss evaluation were "A".

In the magenta ink 1 (M1) of Example 6, the result of the ink ejectability evaluation was "A", but the result of the gloss evaluation was "B". This may be because the value of (D95−D5)/Da was slightly large, so that the amount of large pigment particles contained in the ink was somewhat larger.

In the magenta ink 3 (M3) of Comparative Example 6, the average particle diameter of the pigment 1.3. Therefore, the result of the gloss evaluation was "C".

(Cyan Inks)

In the cyan inks 1 and 2 (C1 and C2) of Examples 8 and 9, the average particle diameter Da was 100 nm or less, and the value of (D95−D5)/Da was 1.2 or less. Therefore, good results were obtained, i.e., the results of the ink ejectability evaluation and the gloss evaluation were "A".

In the cyan ink 3 (C3) of Comparative Example 7, the value of (D95−D5)/Da was much greater than 1.3. Therefore, the result of the gloss evaluation was "C".

(Ink Sets)

In the ink set 2 of Example 11, the favorable characteristics of each of the color inks constituting the ink set remained, and therefore the gloss evaluation results for red, green and blue colors were all "A".

In the ink set 1 of Example 10, the gloss evaluation result for green color was "A", but the gloss evaluation results for red and blue colors were "B". This is because the gloss evaluation result for the magenta ink 1 (M1) used was "B".

In the ink set 3 of Comparative Example 8 in which the gloss evaluation results for all the color inks constituting the ink set were "C", the gloss evaluation results for all of red, green and blue colors were "C".

Example 12

Production of Ink Set

The black ink 2 (Bk2) of Example 2 was added to the ink set 2 of Example 11, whereby an ink set 4 was configured. In this ink set 4, the gloss evaluation results for red, green and blue colors were all "A", and the results of the OD value evaluation, the ink ejectability evaluation and the edge evaluation for the objects printed with the black ink were all "A".

What is claimed is:

1. A black ink for ink-jet recording comprising a pigment, wherein an average particle diameter Da of the pigment is in a range of about 90 nm to about 130 nm, and (D95−D5)/Da is about 1.4 or less, where D5 is a 5% cumulative particle diameter of the pigment and D95 is a 95% cumulative particle diameter of the pigment.

2. A black ink for ink-jet recording according to claim 1, wherein (D95−D5)/Da is about 1.3 or less.

3. A color ink for ink-jet recording comprising a pigment, wherein an average particle diameter Da of the pigment is about 100 nm or less, and (D95−D5)/Da is about 1.3 or less, where D5 is a 5% cumulative particle diameter of the pigment and D95 is a 95% cumulative particle diameter of the pigment.

4. A color ink for ink-jet recording according to claim 3, wherein (D95−D5)/Da is about 1.2 or less.

5. An ink set for ink-jet recording comprising a plurality of different color inks, each color ink comprising a pigment, wherein an average particle diameter Da of the pigment is about 100 nm or less, and (D95−D5)/Da is about 1.3 or less, where D5 is a 5% cumulative particle diameter of the pigment and D95 is a 95% cumulative particle diameter of the pigment.

6. An ink set for ink-jet recording according to claim 5, wherein a difference in the value of (D95−D5)/Da between the pigment comprised in one of any two of the plurality of different color inks and the pigment comprised in the other color ink is about 0.1 or less.

7. An ink set for ink-jet recording according to claim 5, wherein a yellow ink, a magenta ink and a cyan ink are used as the color inks.

8. An ink set for ink-jet recording, comprising a black ink comprising a pigment and a color ink comprising a pigment, wherein:
   an average particle diameter Da of the pigment comprised in the black ink is in the range of about 90 nm to about 130 nm and (D95−D5)/Da is about 1.4 or less, where D5 is a 5% cumulative particle diameter of the pigment comprised in the black ink and D95 is a 95% cumulative particle diameter of the pigment comprised in the black ink; and
   an average particle diameter Da of the pigment comprised in the color ink is about 100 nm or less and (D95−D5)/Da is about 1.3 or less, where DB is a 5% cumulative particle diameter of the pigment comprised in the color ink and D95 is a 95% cumulative particle diameter of the pigment comprised in the color ink.

9. An ink set for ink-jet recording according to claim 8, comprising a plurality of different color inks as the color ink.

10. An ink set for ink-jet recording according to claim 9, wherein a difference in the value of (D95−D5)/Da between the pigment comprised in one of any two of the plurality of different color inks and the pigment comprised in the other color ink is about 0.1 or less.

11. An ink set for ink-jet recording according to claim 9, wherein a yellow ink, a magenta ink and a cyan ink are used as the color inks.

* * * * *

UNITED STATES PATENT AND TRADEMARK OFFICE
CERTIFICATE OF CORRECTION

| | | |
|---|---|---|
| PATENT NO. | : 7,763,107 B2 | Page 1 of 1 |
| APPLICATION NO. | : 11/965398 | |
| DATED | : July 27, 2010 | |
| INVENTOR(S) | : Hisako Tonishi | |

It is certified that error appears in the above-identified patent and that said Letters Patent is hereby corrected as shown below:

Column 14, Claim 8, Line 34:
        Please delete "DB" and insert --D5--.

Signed and Sealed this
Twenty-second Day of March, 2011

David J. Kappos
*Director of the United States Patent and Trademark Office*